United States Patent
Do et al.

(10) Patent No.: US 12,096,472 B2
(45) Date of Patent: Sep. 17, 2024

(54) ADAPTIVE SENSING MECHANISM FOR UNLICENSED NETWORKS

(71) Applicant: Telefonaktiebolaget LM Ericsson (publ), Stockholm (SE)

(72) Inventors: Tai Do, Lund (SE); Peter Alriksson, Hörby (SE); Stephen Grant, Pleasanton, CA (US); Min Wang, Luleå (SE); Jan Christoffersson, Luleå (SE); Narendar Madhavan, Bara (SE); Reem Karaki, Aachen (DE); Guido Roland Hiertz, Aachen (DE); Havish Koorapaty, Saratoga, CA (US); Johan Rune, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 567 days.

(21) Appl. No.: 17/290,559

(22) PCT Filed: Sep. 30, 2019

(86) PCT No.: PCT/IB2019/058316
§ 371 (c)(1),
(2) Date: Apr. 30, 2021

(87) PCT Pub. No.: WO2020/089709
PCT Pub. Date: May 7, 2020

(65) Prior Publication Data
US 2021/0410185 A1    Dec. 30, 2021

Related U.S. Application Data

(60) Provisional application No. 62/755,132, filed on Nov. 2, 2018.

(51) Int. Cl.
*H04W 74/0808*   (2024.01)
*H04W 16/14*   (2009.01)
*H04W 24/10*   (2009.01)

(52) U.S. Cl.
CPC ....... *H04W 74/0808* (2013.01); *H04W 16/14* (2013.01); *H04W 24/10* (2013.01)

(58) Field of Classification Search
CPC . H04W 74/0808; H04W 16/14; H04W 24/10; H04W 74/006
See application file for complete search history.

(56) References Cited

U.S. PATENT DOCUMENTS 10,045,302 B2 *   8/2018   Barriac ................. H04W 52/28
2007/0242621 A1   10/2007   Nandagopalan et al.
(Continued)

FOREIGN PATENT DOCUMENTS

WO    2017162005 A1    9/2017

OTHER PUBLICATIONS

International Search Report and Written Opinion issued in International Application No. PCT/IB2019/058316 dated Jan. 24, 2020 (16 pages).
(Continued)

*Primary Examiner* — Jae Y Lee
(74) *Attorney, Agent, or Firm* — Rothwell, Figg, Ernst & Manbeck, P.C.

(57) ABSTRACT

Methods and systems for dynamically adapting an Energy Detection (ED) threshold for use in an unlicensed network are provided. According to one aspect, a method for dynamically adapting ED threshold for use in an unlicensed network comprises determining an ED threshold based on a current state of an unlicensed network and using the deter-
(Continued)

mined ED threshold for channel sensing and/or signaling the ED threshold to another entity for use during channel sensing.

15 Claims, 8 Drawing Sheets

(56) References Cited

U.S. PATENT DOCUMENTS

| | | | | |
|---|---|---|---|---|
| 2012/0263055 | A1* | 10/2012 | Liu | H04W 52/262 |
| | | | | 370/252 |
| 2016/0080974 | A1 | 3/2016 | Barriac et al. | |
| 2016/0112969 | A1* | 4/2016 | Zhou | H04W 24/08 |
| | | | | 370/252 |
| 2017/0273109 | A1* | 9/2017 | Babaei | H04W 52/42 |
| 2017/0373956 | A1* | 12/2017 | Keskin | H04W 52/0277 |
| 2018/0027452 | A1 | 1/2018 | Tanaka | |
| 2018/0183855 | A1* | 6/2018 | Sabella | H04L 67/04 |
| 2018/0270834 | A1* | 9/2018 | Falconetti | H04B 17/345 |
| 2019/0098666 | A1* | 3/2019 | Chen | H04B 17/336 |
| 2019/0230578 | A1* | 7/2019 | Karaki | H04W 48/12 |
| 2019/0373301 | A1* | 12/2019 | Gunasekara | H04N 21/6405 |
| 2020/0059398 | A1* | 2/2020 | Pan | H04W 56/001 |
| 2020/0314906 | A1* | 10/2020 | Goyal | H04B 7/0695 |
| 2021/0235492 | A1* | 7/2021 | Iyer | H04W 72/23 |
| 2021/0360698 | A1* | 11/2021 | Xu | H04W 72/0446 |

OTHER PUBLICATIONS

Cisco Systems, "Remaining Details of DL LBT Procedure for Rel-13 LAA", 3GPP TSG RAN WG1 #82bis, R1-155150, Malmo, Sweden, Oct. 5-9, 2015 (5 pages).

LG Electronics, "LBT schemes in LAA UL" 3GPP TSG RAN WG1 meeting #84, R1-160630, St Julian's, Malta, Feb. 15-19, 2016 (10 pages).

Ericsson, "On the use of a preamble for NR-U", 3GPP TSG-RAN WG1 Meeting #95, R1-1813462, Spokane, USA, Nov. 12-16, 2018 (12 pages).

* cited by examiner

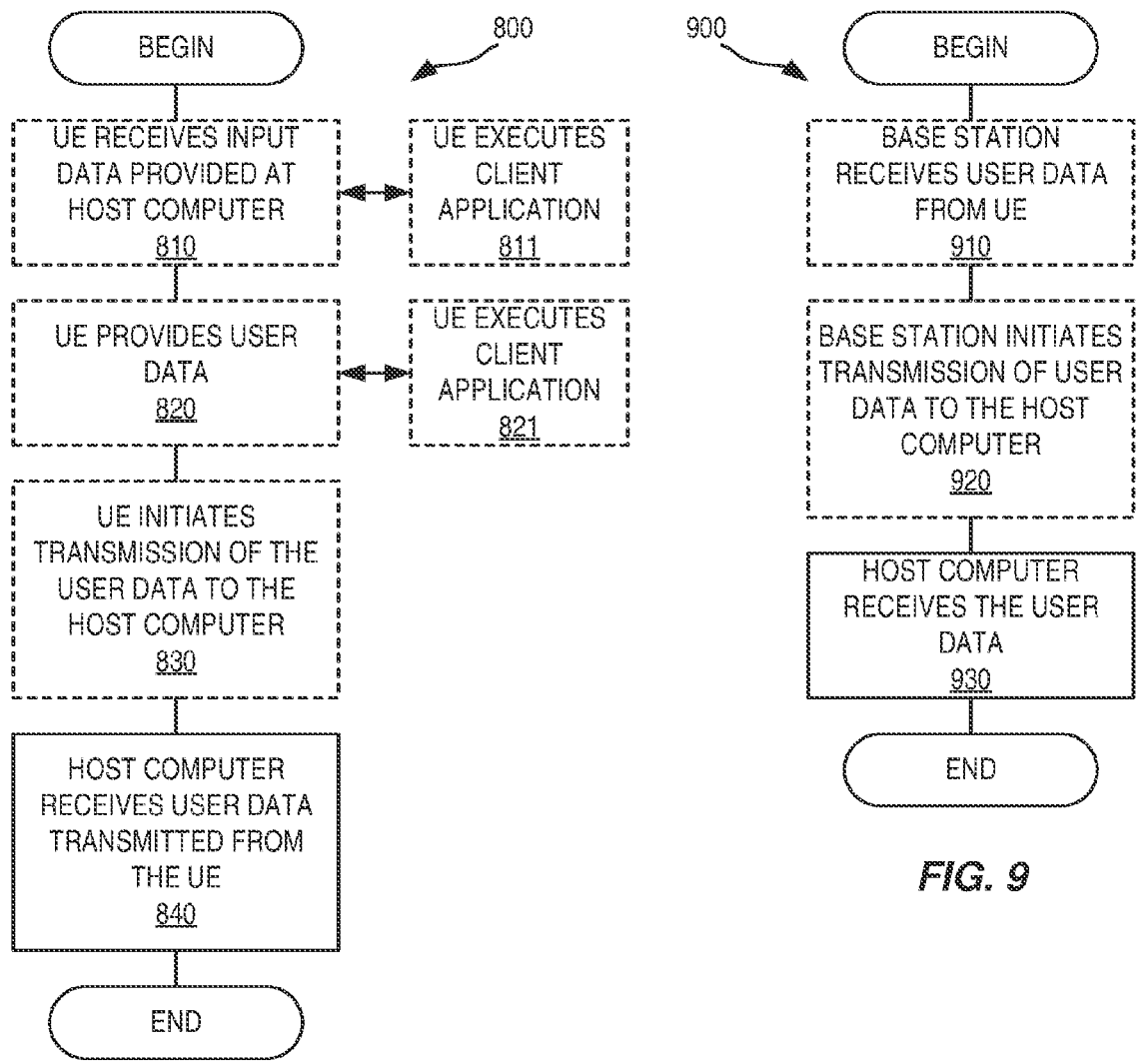

ADAPTIVE SENSING MECHANISM FOR UNLICENSED NETWORKS

RELATED APPLICATIONS

This application is a 35 U.S.C. § 371 National Stage of International Patent Application No. PCT/IB2019/058316, filed Sep. 30, 2019, designating the United States, which claims the benefit of U.S. provisional patent application Ser. No. 62/755,132, filed Nov. 2, 2018, the disclosure of which is hereby incorporated herein-by reference herein in its entirety.

TECHNICAL FIELD

The disclosed subject matter relates generally to telecommunications. Certain embodiments relate more particularly to concepts such as sounding reference signals
(SRS), new radio (NR), and aperiodic triggering offset.

BACKGROUND

NR in Unlicensed Spectrum (NR-U)

Allowing unlicensed networks, i.e., networks that operate in shared spectrum (or unlicensed spectrum) to effectively use the available spectrum is an attractive approach to increase system capacity. Although unlicensed spectrum does not match the qualities of the licensed regime, solutions that allow an efficient use of it as a complement to licensed deployments have the potential to bring great value to the 3GPP operators, and, ultimately, to the 3GPP industry as a whole. This type of solution would enable operators and vendors to leverage the existing or planned investments in LTE/NR hardware in the radio and core network.

For a node to be allowed to transmit in unlicensed spectrum, it typically needs to perform a clear channel assessment (CCA) or Listen-Before-Talk (LBT). This procedure typically includes sensing the wireless medium to be unoccupied. Sensing the medium to be idle can be done in different ways, e.g., using energy detection, preamble detection or using virtual carrier sensing, where the former implies that the node listens to the channel and measures the energy of the interference (plus noise) for a number of time intervals. If the energy is smaller than a certain threshold (often called Energy Detection (ED) threshold), it declares that the medium is idle. Otherwise, it declares that the medium is busy (or occupied).

After sensing the medium to be idle, the node is typically allowed to transmit for a certain duration, sometimes referred to as transmission opportunity (TXOP) or COT (Channel Occupancy Time). In some jurisdictions, the maximum duration of a COT depends the type of CCA that has been performed. Typical ranges are 1 ms to 10 ms. This limit is denoted Maximum Channel Occupancy Time (MCOT). During a COT a gNB is allowed to share its access to the wireless medium with uplink transmissions from UEs. Sometimes, this is referred to as shared COT. A major goal of introducing the shared COT concept is to minimize the need of UEs to perform a long LBT prior to transmissions in the uplink. In some jurisdictions, a scheduled UEs is permitted performing a short LBT immediately following the downlink transmission.

LBT Parameters in Unlicensed Spectrum

There are two main parameters that a network node needs to know before performing LBT: sensing threshold and sensing duration. In an LAA LTE network, for example, the UE sensing threshold is configured by the gNB via RRC signaling, and normally unchanged over a connected period. The UE sensing duration, which depends on LBT's category, is signaled (more frequently than sensing threshold) to UE using UL grant.

Typically, the ED threshold is set regulatory requirements, e.g., ETSI EN 301 893. The ED threshold might depend on the Radio Technology (RAT) or frequency band in use. For instance, in the 5 GHz frequency band, the ED threshold for LTE based LAA equipment and for Wi-Fi (IEEE 802.11) equipment are −85 dBm/MHz and −75 dBm/MHz, respectively.

The ED threshold defined in regulatory documents settles an upper limit for operation in unlicensed spectrum. A network may perform channel sensing with an ED threshold below the ED threshold defined for that band.

SUMMARY

In certain embodiments of the disclosed subject matter, apparatuses and methods are provided for determining and/or signaling an Energy Detection (ED) threshold according to a network's state. For instance, in certain embodiments a New Radio (NR) Base Station (gNB) determines a new, optimized, and/or improved ED threshold based on the current state of the network. In certain embodiments a gNB uses the ED threshold for channel sensing and/or signals to the User Equipment(s) (UE(s)) the ED threshold to use for the next Uplink (UL) transmissions. Certain embodiments are presented with respect to NR in Unlicensed Spectrum (NR-U), but the described concepts can be applied in other contexts, such as other Radio Access Technologies (RATs).

According to one aspect of the present disclosure, a method for dynamically adapting an ED threshold for use in an unlicensed network comprises: determining an ED threshold based on a current state of an unlicensed network; and using the determined ED threshold for channel sensing, wherein using the determined ED threshold for channel sensing comprises sensing a channel using the determined ED threshold or signaling the determined ED threshold to another entity for use to sense a channel.

In some embodiments, determining the ED threshold based on the current state of the unlicensed network comprises determining the ED threshold based on a traffic load in the unlicensed network.

In some embodiments, determining the ED threshold based on the current state of the unlicensed network comprises determining the ED threshold based on a number of UE being served.

In some embodiments, determining the ED threshold based on the current state of the unlicensed network comprises determining the ED threshold based on a level of interference on one or more carriers of the unlicensed network.

In some embodiments, determining the ED threshold based on the current state of the unlicensed network comprises determining the ED threshold based on a collision rate of downlink and/or uplink transmissions observed over a certain period.

In some embodiments, determining the ED threshold based on the collision rate of downlink and/or uplink transmissions observed over the certain period comprises: counting a number of Negative Acknowledgements (NACKs) over the certain period; determining that the count is higher than a first threshold; and, in response to determining that the count is higher than the first threshold, adjusting the ED threshold to a lower value.

In some embodiments, determining the ED threshold based on the collision rate of downlink and/or uplink transmissions observed over the certain period comprises: counting a number of NACKs over the certain period; determining that the count is lower than a second threshold; and, in response to determining that the count is lower than the second threshold, adjusting the ED threshold to a higher value.

In some embodiments, determining the ED threshold based on the collision rate of downlink and/or uplink transmissions observed over the certain period comprises: measuring a ratio between Acknowledgements (ACKs) and NACKs received over the certain period; computing a difference between the measured ACK/NACK ratio and a desired ACK/NACK ratio; and adjusting the ED threshold based on the difference.

In some embodiments, determining the ED threshold based on the current state of the unlicensed network comprises determining the ED threshold based on a Signal to Interference plus Noise Ratio (SINR) value of one or more uplinks for UEs being served.

In some embodiments, determining the ED threshold based on the SINR values of the one or more uplinks for the UEs being served comprises: calculating a SINR value as a function of the SINR values of the one or more uplinks for the UEs being served; and in response to determining that a SINR value of an uplink is lower than a first threshold, decreasing the value of the ED threshold; or, in response to determining that the SINR value of the uplink is higher than a second threshold, increasing the value of the ED threshold.

In some embodiments, calculating the SINR value as a function of the SINR values of the one or more uplinks for the UEs being served comprises calculating the SINR value as a minimum SINR value of the SINR values of the one or more uplinks for the UEs being served.

In some embodiments, calculating the SINR value as a function of the SINR values of the one or more uplinks for the UEs being served comprises calculating the SINR value as the linear average of the SINR values of the one or more uplinks for the UEs being served.

In some embodiments, determining the ED threshold based on the current state of the unlicensed network further comprises choosing a Modulation and Coding Scheme (MCS).

In some embodiments, determining the ED threshold based on the current state of the unlicensed network comprises determining the ED threshold based on a latency requirement of data to be sent.

In some embodiments, determining the ED threshold based on the current state of the unlicensed network comprises determining the ED threshold based on a declaration or detection of a radio link failure.

In some embodiments, determining the ED threshold based on the declaration or detection of the radio link failure comprises determining the ED threshold based also on a number of Radio Resource Control (RRC) connection re-establishment attempts.

In some embodiments, determining the ED threshold based on the current state of the unlicensed network comprises determining the ED threshold based on an average measured energy on a channel.

In some embodiments, determining the ED threshold based on the current state of the unlicensed network comprises determining the ED threshold based on a set of one or more statistics from one or more active UEs.

In some embodiments, the set of one or more statistics comprises at least one of: a successful packet receive ratio; an obtained SINR; and a ratio of cancelled uplink transmissions due to a Listen-Before-Talk (LBT) failure.

In some embodiments, determining the ED threshold based on the current state of the unlicensed network comprises determining the ED threshold based on a determined receiver sensitivity.

In some embodiments, a receiver sensitivity is determined by measuring a received signal strength corresponding to a lowest successful MCS received from a UE over an observation period.

In some embodiments, determining the ED threshold based on the current state of the unlicensed network comprises determining the ED threshold based on a combination of one or more of any of the methods disclosed herein.

In some embodiments, using the determined ED threshold for channel sensing comprises sensing a channel using the determined ED threshold.

In some embodiments, using the determined ED threshold for channel sensing comprises signaling the determined ED threshold to another entity for use to sense a channel.

In some embodiments, signaling (1104) the ED threshold comprises signaling via an uplink grant.

In some embodiments, signaling the ED threshold further comprises signaling a Listen-Before-Talk, LBT, category.

In some embodiments, signaling the ED threshold comprises signaling via a Group Common Physical Downlink Control Channel, GC-PDCCH.

In some embodiments, signaling the ED threshold comprises signaling via a Radio Resource Control, RRC, signaling.

In some embodiments, the signaling received from the network node comprises system information.

In some embodiments, signaling the ED threshold comprises signaling an index or an offset into a table containing ED values.

In some embodiments, the method is performed by a network node.

In some embodiments, the method is performed by a UE.

According to another aspect of the present disclosure, a method for dynamically adapting an ED threshold for use in an unlicensed network comprises: at a UE: selecting, based on a current state of an unlicensed network or signaling received from a network node, an ED threshold from a preconfigured set of ED thresholds; and using the selected ED threshold for channel sensing.

In some embodiments, the ED threshold is selected based at least in part on a planned transmit power.

In some embodiments, the ED threshold is selected based at least in part on information indicating how harmful interference to other devices in the area would be when the UE transmits after using the selected ED threshold for channel sensing.

In some embodiments, the information indicating how harmful the interference to other devices in the area would be when the UE transmits after using the selected ED threshold for channel sensing is provided by neighboring base stations.

In some embodiments, the information indicating how harmful the interference to other devices in the area would be when the UE transmits after using the selected ED threshold for channel sensing comprises an average SINR experienced by a neighbor base station and/or by UEs being served by the neighbor base station.

In some embodiments, the ED threshold is selected based at least in part on information indicating how often a receiver fails to receive transmissions from the UE.

In some embodiments, the information indicating how often the receiver fails to receive transmissions from the UE comprises a number of NACKs received from the receiver.

In some embodiments, the ED threshold is selected based at least in part on a SINR experienced by a receiver of transmissions from the UE.

In some embodiments, the ED threshold is selected based at least in part on a difference or ratio between detected energy and the ED threshold.

In some embodiments, the ED threshold is selected based at least in part on statistics of a detected energy level.

In some embodiments, the statistics of the detected energy level are based on data generated or provided by the UE or by a base station that is serving the UE.

In some embodiments, the statistics of the detected energy level comprise a maximum or minimum observed energy level within a time window, an energy level variance within a time window, or average lengths of time windows in which energy is received above a certain threshold.

In some embodiments, the ED threshold is selected based at least in part on a density of transmitters proximate to the UE.

In some embodiments, the ED threshold is selected based at least in part on information about ED thresholds used by neighboring base stations or UEs.

In some embodiments, the ED threshold is selected based at least in part on statistics regarding a duration that a wireless medium remains unoccupied between transmissions.

In some embodiments, the ED threshold is selected based at least in part on one or more of a set of performance metrics, the set comprising: cell throughput, cell latency, user throughput, and user latency.

In some embodiments, selecting the ED threshold comprises selecting an ED threshold for each of a plurality of signals, signal types, or signal priorities.

In some embodiments, the preconfigured set of ED thresholds comprises a discrete set of ED threshold values.

In some embodiments, the preconfigured set of ED thresholds identifies a range of ED threshold values.

In some embodiments, the preconfigured set of ED thresholds is provided by a network node prior to the selecting step.

In some embodiments, the preconfigured set of ED thresholds is provided using layer 1 signaling.

In some embodiments, the preconfigured set of ED thresholds is provided as part of a downlink scheduling assignment, as part of an uplink scheduling assignment, or as part of Downlink Control Information (DCI).

In some embodiments, the ED threshold is selected based on signaling, received from the network node, that identifies an ED threshold from the preconfigured set of ED thresholds.

In some embodiments, the signaling received from the network node comprises an uplink grant.

In some embodiments, the signaling received from the network node further comprises information indicating a LBT category.

In some embodiments, the signaling received from the network node comprises a Group Common Physical Downlink Control Channel (GC-PDCCH).

In some embodiments, the signaling received from the network node comprises RRC signaling.

In some embodiments, the signaling received from the network node comprises system information.

In some embodiments, the signaling received from the network node comprises an index or an offset into a table containing ED values.

In some embodiments, the table containing ED values was configured using RRC signaling.

According to yet another aspect of the present disclosure, a method for dynamically adapting an ED threshold for use in an unlicensed network comprises: at a base station: selecting, based on a current state of an unlicensed network, an ED threshold from a preconfigured set of ED thresholds; and using the selected ED threshold for channel sensing, or signaling, to a UE, the selected ED threshold for channel sensing.

In some embodiments, the ED threshold is selected based at least in part on a planned transmit power of the UE.

In some embodiments, the ED threshold is selected based at least in part on information indicating how harmful interference to other devices in the area would be when the UE transmits after using the selected ED threshold for channel sensing.

In some embodiments, the information indicating how harmful the interference to other devices in the area would be when the UE transmits after using the selected ED threshold for channel sensing is provided by neighboring base stations.

In some embodiments, the information indicating how harmful the interference to other devices in the area would be when the UE transmits after using the selected ED threshold for channel sensing comprises an average SINR experienced by a neighbor base station and/or by UEs being served by the neighbor base station.

In some embodiments, the ED threshold is selected based at least in part on information indicating how often the base station failed to receive transmissions from the UE.

In some embodiments, the ED threshold is selected based at least in part on a SINR experienced by the base station for transmissions from the UE.

In some embodiments, the ED threshold is selected based at least in part on a difference or ratio between detected energy and the ED threshold for the UE.

In some embodiments, the ED threshold is selected based at least in part on statistics of a detected energy level.

In some embodiments, the statistics of the detected energy level are based on data generated or provided by the UE.

In some embodiments, the statistics of the detected energy level comprise a maximum or minimum observed energy level within a time window, an energy level variance within a time window, or average lengths of time windows in which energy is received above a certain threshold.

In some embodiments, the ED threshold is selected based at least in part on a density of transmitters proximate to the UE.

In some embodiments, the ED threshold is selected based at least in part on information about ED thresholds used by neighboring base stations or UEs.

In some embodiments, the ED threshold is selected based at least in part on statistics regarding a duration that a wireless medium remains unoccupied between transmissions.

In some embodiments, the ED threshold is selected based at least in part on one or more of a set of performance metrics, the set comprising: cell throughput, cell latency, user throughput, and user latency.

In some embodiments, selecting the ED threshold comprises selecting an ED threshold for each of a plurality of signals, signal types, or signal priorities.

In some embodiments, the preconfigured set of ED thresholds comprises a discrete set of ED threshold values.

In some embodiments, the preconfigured set of ED thresholds identifies a range of ED threshold values.

In some embodiments, the preconfigured set of ED thresholds is provided to the UE prior to the selecting step.

In some embodiments, the preconfigured set of ED thresholds is provided using layer 1 signaling.

In some embodiments, the preconfigured set of ED thresholds is provided as part of a downlink scheduling assignment, as part of and uplink scheduling assignment, or as part of DCI.

In some embodiments, signaling the ED threshold comprises signaling via an uplink grant.

In some embodiments, signaling the ED threshold further comprises signaling a LBT category.

In some embodiments, signaling the ED threshold comprises signaling via a GC-PDCCH.

In some embodiments, signaling the ED threshold comprises signaling via a RRC signaling.

In some embodiments, the signaling received from the network node comprises system information.

In some embodiments, signaling the ED threshold comprises signaling an index or an offset into a table containing ED values.

In some embodiments, the table containing ED values was configured using RRC signaling.

In some embodiments, the method further comprises signaling ED threshold updates.

In some embodiments, signaling ED threshold updates comprises signaling ED threshold updates via a Short Message DCI message.

In some embodiments, the Short Message DCI message further comprises an indication of when to apply the signaling ED threshold updates.

In some embodiments, signaling ED threshold updates comprises using predefined Radio Network Temporary Identifiers (RNTIs) being predefined to indicate specific adjustments to an ED threshold value.

According to yet another aspect of the present disclosure, a network node for dynamically adapting an ED threshold for use in an unlicensed network comprises: one or more processors; and memory storing instructions executable by the one or more processors whereby the network node is operable to perform the steps of any of the methods disclosed herein.

In some embodiments, the network node comprises a base station, a Node B, an enhanced Node B (eNB), a Fifth Generation (5G) Node B, or an NR Node B.

According to yet another aspect of the present disclosure, a network node configured for dynamically adapting an ED threshold for use in an unlicensed network comprises circuitry to perform the steps of any of the methods disclosed herein.

In some embodiments, the network node comprises a base station, a Node B, an eNB, a 5G Node B, or an NR Node B.

According to yet another aspect of the present disclosure, a UE for dynamically adapting an ED threshold for use in an unlicensed network comprises: one or more processors; and memory storing instructions executable by the one or more processors whereby the network node is operable to perform the steps of any of the methods disclosed herein.

According to yet another aspect of the present disclosure, a UE configured for dynamically adapting an ED threshold for use in an unlicensed network comprises circuitry to perform the steps of any of the methods disclosed herein.

An energy detection threshold can be varied based on numerous criteria that are observed during operation of the node operating in the unlicensed band. Examples of such criteria that may be used for adaptation include the following.

1) A continuous duration of time for which the LAA node attempts unsuccessfully to access the channel.
2) Successful attempts at accessing the channel
3) ARQ and HARQ feedback from UEs on licensed or unlicensed carriers
4) RSSI measurements on the channel
5) RSSI measurement reports from UEs on the channel
6) Reconfiguration by the network
7) Buffer occupancy level of LAA node
8) Detection of reference signals from other nodes of the same technology
9) Detection of beacon signals or preamble sequences from other nodes using a different technology
10) Values of parameters used in the listen-before-talk channel access procedure Certain embodiments of the disclosed subject matter are presented in recognition of shortcomings associated with conventional techniques and technologies, such as the following examples. An ED threshold for a certain RAT in regulation may be defined without taking into account the deployment, channel statistics of the networks. Thus, it is not optimal to keep the same ED threshold for all deployments and states of the networks. On one hand, if the deployment is very dense and/or the collision rate is high, performance might improve if the network uses a lower ED threshold for channel sensing. On the other hand, the ED threshold should also not too low (too sensitive) so that the value prevents exploiting spatial reuse opportunities if the deployment is not dense or the collision rate is low.

Selecting a proper ED threshold does not only affect an UE but can also affect the performance of the whole system. Thus, it is reasonable to give the control on adapting ED threshold to the gNB. The gNB should select a proper ED threshold(s) based on system information/statistics and signal to associated devices.

Certain embodiments of the disclosed embodiments may provide potential benefits compared to conventional techniques and technologies, such as the following examples. Certain embodiments provide a low complexity (in term of signaling overhead and specification impact) approach of using different ED thresholds compared to the use of preamble transmission and detection applied in current Wi-Fi systems. Certain embodiments reduce the probability of simultaneous transmissions that cause collisions (by lowering the ED threshold when need) and improves the spatial frequency reuse (increase the ED threshold if possible). Thus, certain embodiments may improve overall spectral efficiency.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 8 illustrates methods implemented in a communication system including a host computer, a base station and a user equipment in accordance with some embodiments of the present disclosure.

FIG. 9 illustrates methods implemented in a communication system including a host computer, a base station and a user equipment in accordance with some embodiments of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Figure 1:
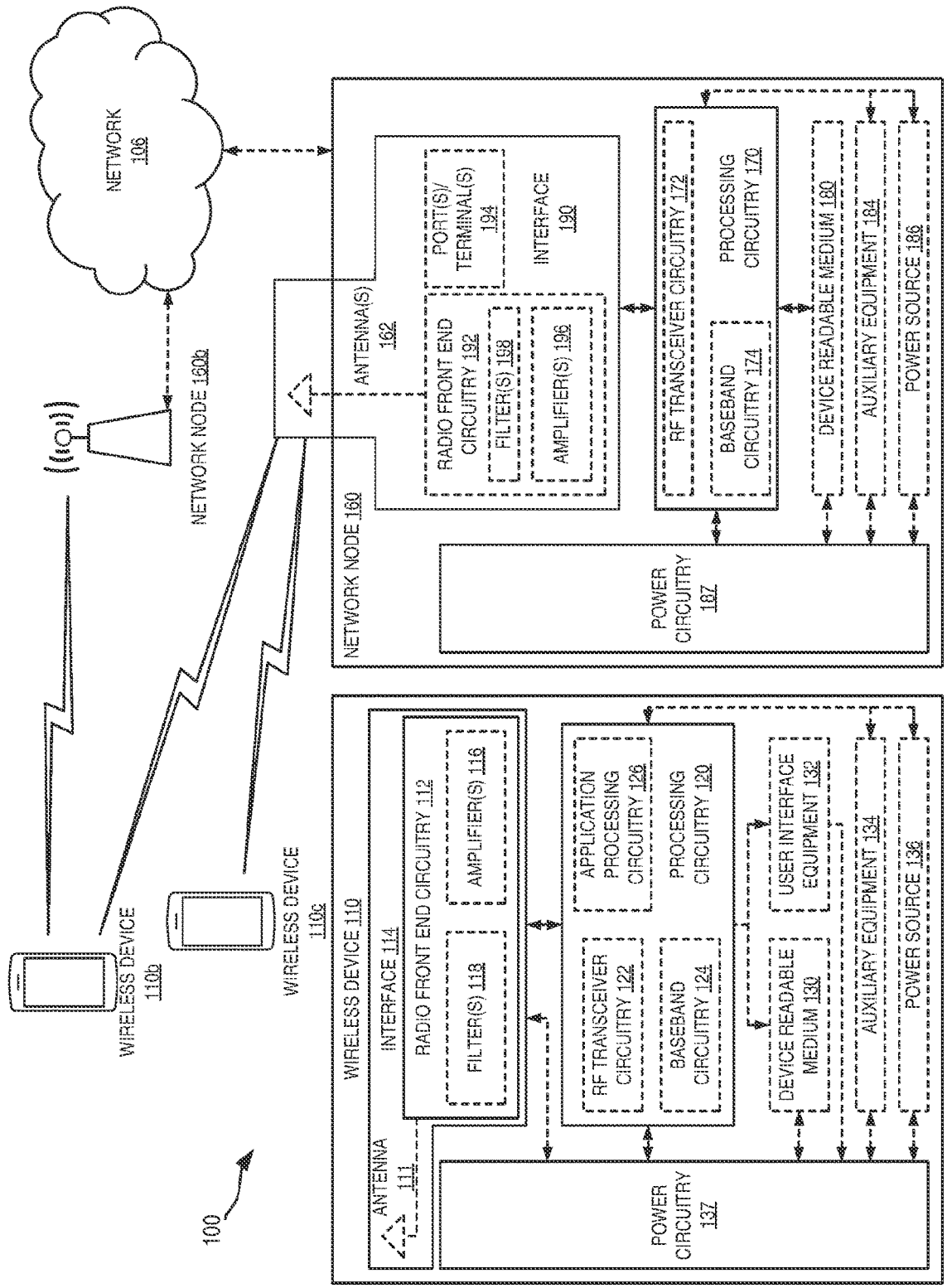
FIG. 1 illustrates wireless network in accordance with some embodiments of the present disclosure.

FIG. 1 illustrates wireless network in accordance with some embodiments of the present disclosure. Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc., and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc., and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 2:
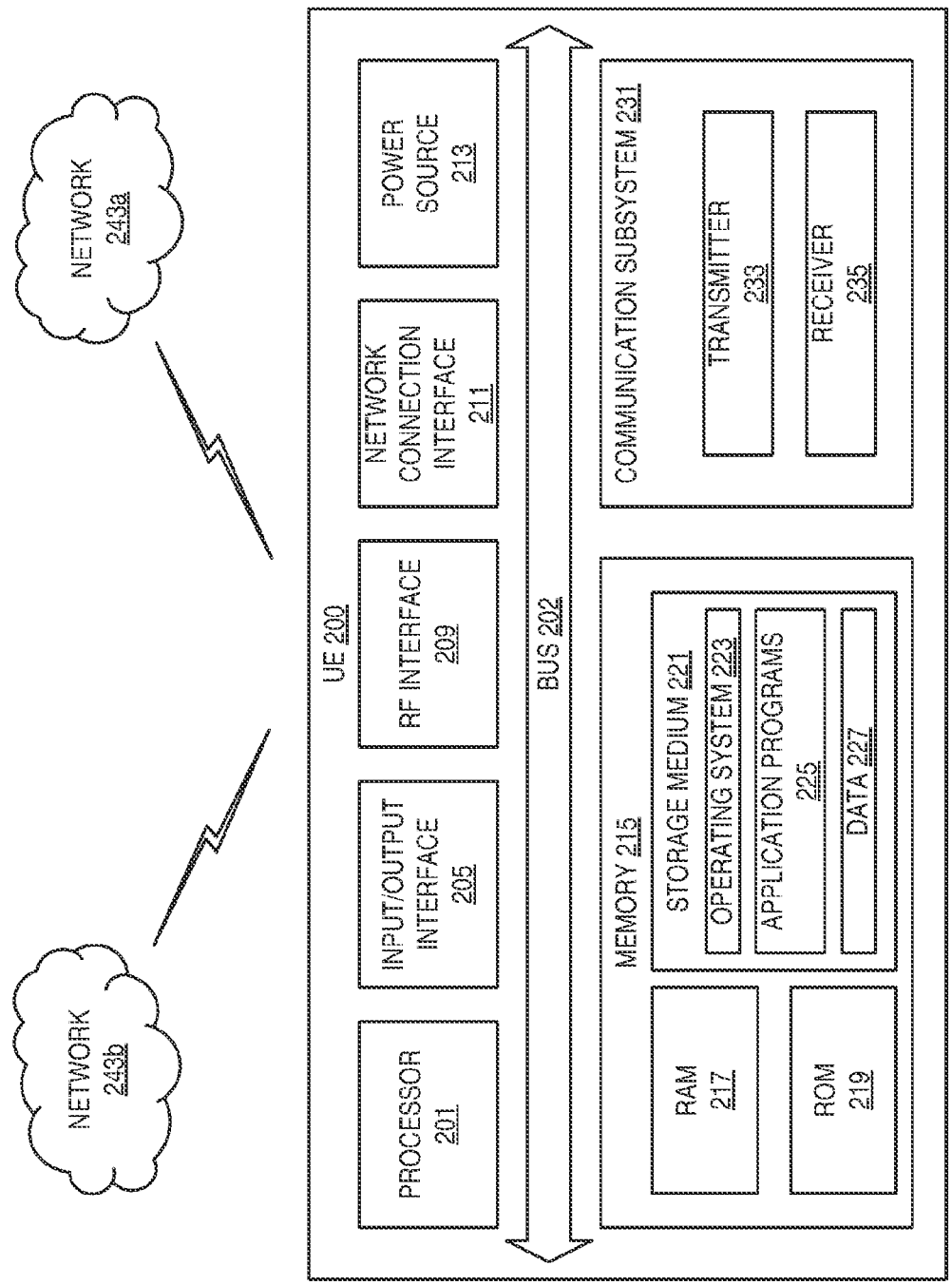
FIG. 2 illustrates a user Equipment in accordance with some embodiments of the present disclosure.

FIG. 2 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 2, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 2 is a UE, the components discussed herein are equally applicable to a WD, and vice-versa.

In FIG. 2, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 2, or only a subset of the components. The level of integration between the components may vary from one UE to another UE. Further, certain UEs may contain multiple instances of a component, such as multiple processors, memories, transceivers, transmitters, receivers, etc.

In FIG. 2, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 2, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 2, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 3:
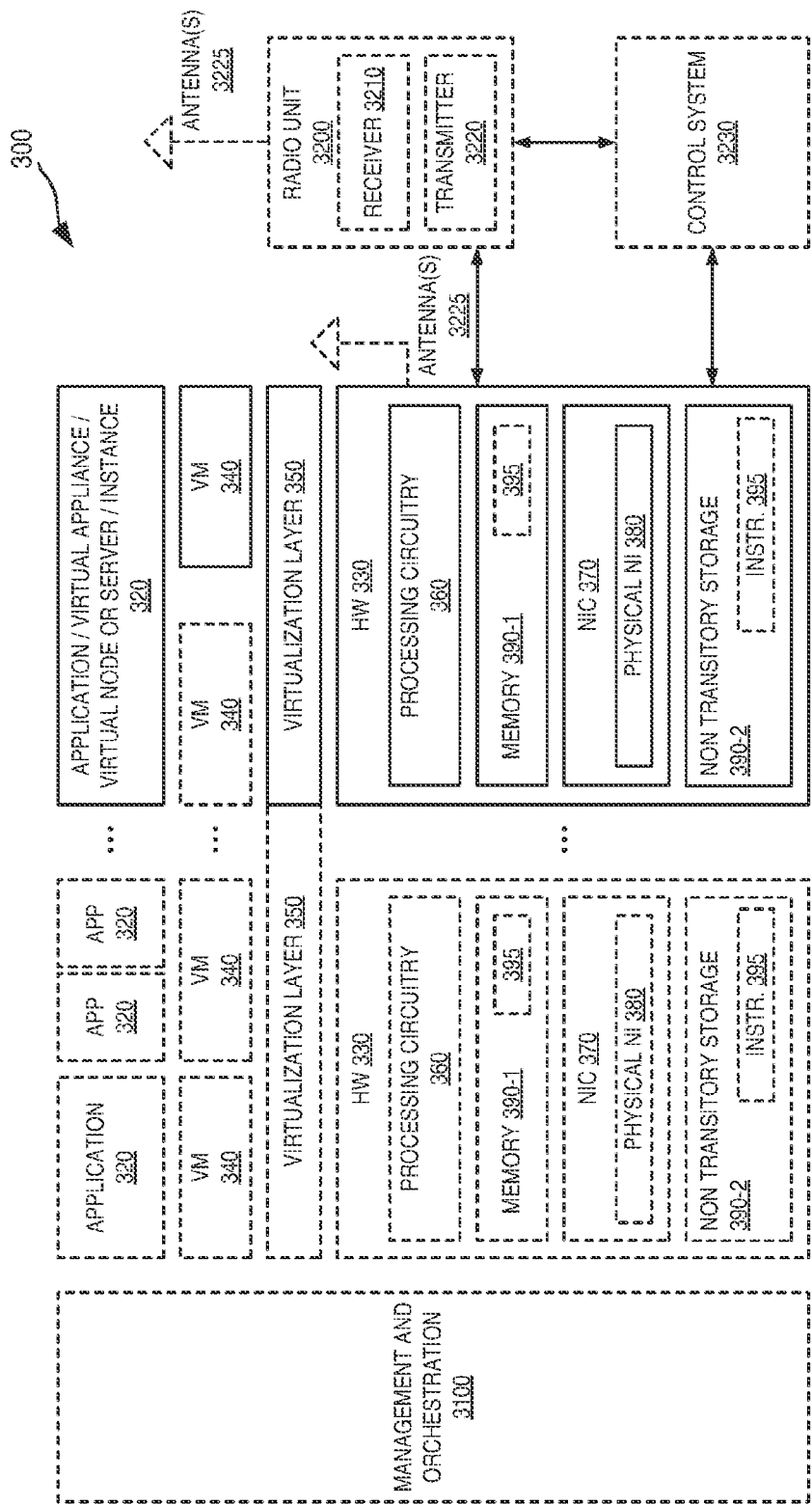
FIG. 3 illustrates a virtualization environment in accordance with some embodiments of the present disclosure.

FIG. 3 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 3, hardware 330 may be a standalone network node with generic or specific components. Hardware 330 may comprise antenna 3225 and may implement some functions via virtualization. Alternatively, hardware 330 may be part of a larger cluster of hardware (e.g., such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 3.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 4:
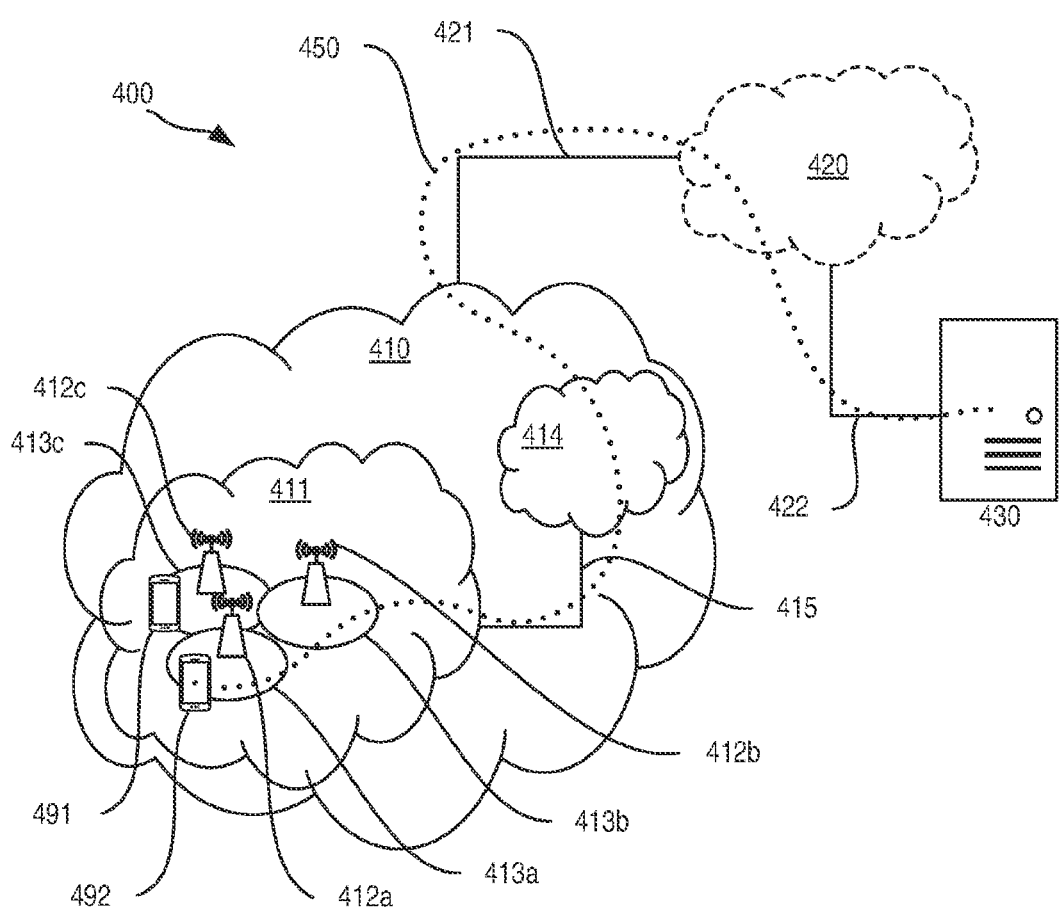
FIG. 4 illustrates a telecommunication network connected via an intermediate network to a host computer in accordance with some embodiments of the present disclosure.

FIG. 4 illustrates a telecommunication network connected via an intermediate network to a host computer in accordance with some embodiments of the present disclosure. Referring to FIG. 4, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 4 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 5:
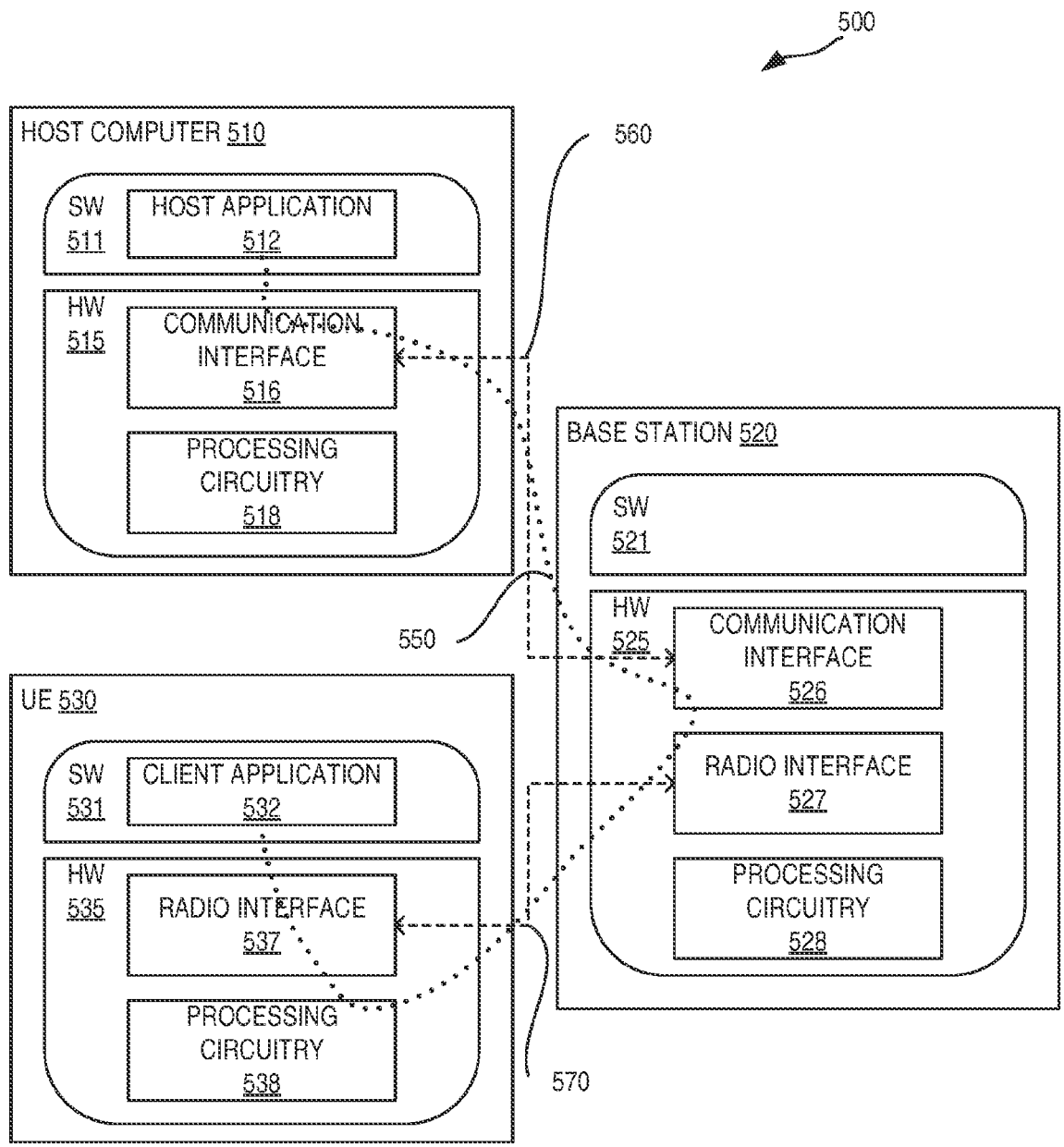
FIG. 5 illustrates a host computer communicating via a base station with a user equipment over a partially wireless connection in accordance with some embodiments of the present disclosure.

FIG. 5 illustrates a host computer communicating via a base station with a user equipment over a partially wireless connection in accordance with some embodiments of the present disclosure. Example implementations, in accordance with an embodiment, of the UE, base station and host computer discussed in the preceding paragraphs will now be described with reference to FIG. 5. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 5) served by base station 520. Communication interface 526 may be configured to facilitate connection 560 to host computer 510. Connection 560 may be direct or it may pass through a core network (not shown in FIG. 5) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. It's hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 5 may be similar or identical to host computer 430, one of base stations 412a, 412b, 412c and one of UEs 491, 492 of FIG. 4, respectively. This is to say, the inner workings of these entities may be as shown in FIG. 5 and independently, the surrounding network topology may be that of FIG. 4.

In FIG. 5, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 6, 7:
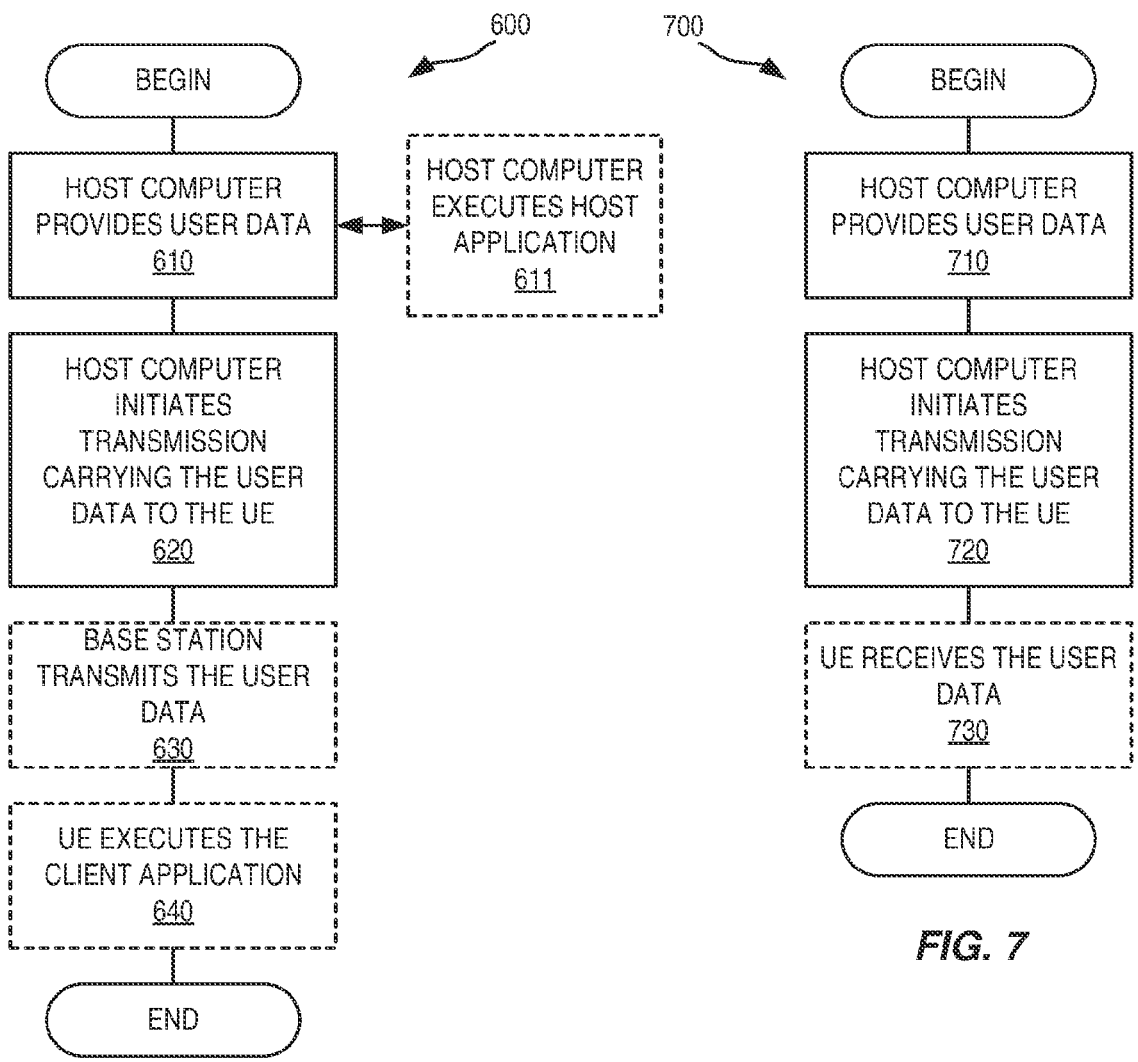
FIG. 6 illustrates methods implemented in a communication system including a host computer, a base station and a user equipment in accordance with some embodiments of the present disclosure.
FIG. 7 illustrates methods implemented in a communication system including a host computer, a base station and a user equipment in accordance with some embodiments of the present disclosure.

FIG. 6 is a flowchart illustrating a method implemented in a communication system, in accordance with some embodiments of the present disclosure. The communication system includes a host computer, a base station and a UE which may be those described with reference to FIGS. 4 and 5. For the sake of brevity, only drawing references to FIG. 6 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 7 is a flowchart illustrating a method implemented in a communication system, in accordance with some embodiments of the present disclosure. The communication system includes a host computer, a base station and a UE which may be those described with reference to FIGS. 4 and 5. For simplicity of the present disclosure, only drawing references to FIG. 7 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

FIG. 8 is a flowchart illustrating a method implemented in a communication system, in accordance with some embodiments of the present disclosure. The communication system includes a host computer, a base station and a UE which may be those described with reference to FIGS. 4 and 5. For simplicity of the present disclosure, only drawing references to FIG. 8 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 9 is a flowchart illustrating a method implemented in a communication system, in accordance with some embodiments of the present disclosure. The communication system includes a host computer, a base station and a UE which may be those described with reference to FIGS. 4 and 5. For simplicity of the present disclosure, only drawing references to FIG. 9 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Adaptive Sensing Mechanism

Figure 10:
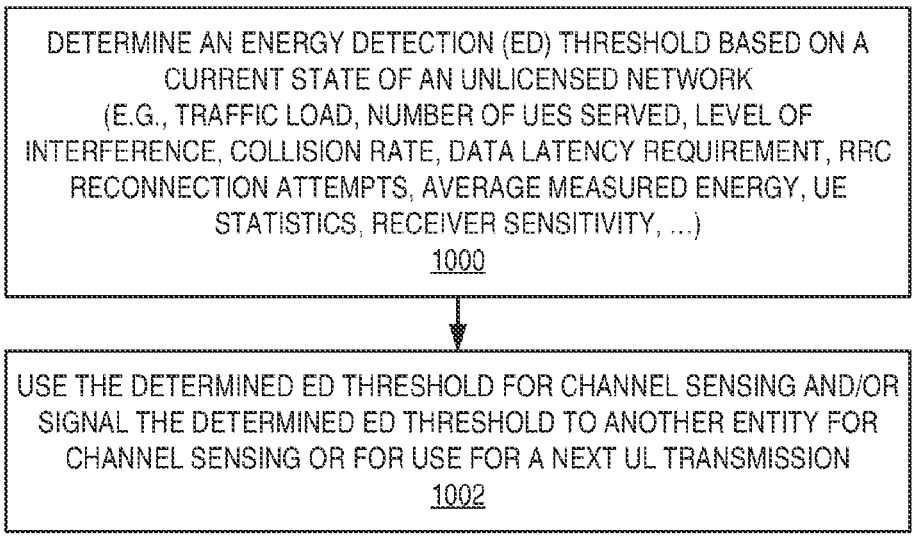
FIG. 10 illustrates a method of determining and dynamically signaling an ED threshold according to the network's state according to some embodiments of the present disclosure.

FIG. 10 is a flowchart illustrating a method of determining and dynamically signaling an ED threshold according to the network's state according to some embodiments of the present disclosure. In the embodiment illustrated in FIG. 10, the method includes the following steps. In step 1000, the entity, which may be a gNB or other base station or may be a UE or a network entity, determines a (new) ED threshold based on the current state of the network, which may be defined based on one or more parameters including but not limited to: the traffic load in the network, the number of UEs being served, the level of interference on the carrier etc. In step 1002, the gNB uses the (new) ED threshold for channel sensing and/or signals to the UE(s) the ED threshold to use for the next UL transmissions. Such a method may be performed in relation to NR-U technology or other applicable technologies, such as other RATs.

ED Threshold Determination

In some embodiments, a gNB determines the ED threshold based on the collision rates of the DL or/and UL transmissions observed over a certain period. For example, if the gNB counts the number of NACK over an observation period is larger than a certain threshold, it will update the ED threshold to a lower value.

In some alternative embodiments, the gNB measures the ACK/NACK ratio over a period of time and tries to keep it at a particular level (e.g., 10%) using a control loop. That is, it computes the difference between the measured ACK/NACK ratio and the setpoint (e.g., 10%) and adjusts the ED threshold based on the difference.

In some alternative embodiments, the gNB determines the ED threshold based on the current or typical situation of aspects impacting interference between nodes and devices in the area, e.g., the number active UEs in the gNB's cell (and neighbor cell), the traffic load measured by one or more metrics, e.g., the packet arrival rate, and so on.

In some alternative embodiments, the gNB determines the ED threshold based on the SINR of the uplinks for the UEs being served by the gNB. For example, if the SINR of some function of the serving links is lower than a certain threshold, gNB will update the ED threshold to a lower value. The function could be the minimum SINR among the UEs being served, a linear average of the SINR. It will be obvious to those skilled in the art that other functions may be used as well as part of this embodiment.

In some alternative embodiments the modulation and coding rate (MCS) is jointly chosen together with the ED threshold. For example, a higher ED threshold is chosen in combination with a more robust (lower) MCS and vice versa, In some alternative embodiments the latency requirement of the data to be sent is taken into account. For example, for urgent traffic a more robust (lower) MCS in combination with a higher ED threshold can be used and for best effort traffic a less robust (higher) MCS in combination with a lower ED threshold can be used.

In some alternative embodiments the gNB determines the ED threshold based at least in part on gNB declaration of radio link failure. For example, if the maximum number of HARQ and RLC retransmissions is reached creating a gNB declared RLF, this can be a sign that the UEs are experiencing heavy interference or the medium is highly utilized causing excessive LBT failures. In response, the gNB can reduce the ED threshold.

In some alternative embodiments the gNB determines the ED threshold based at least in part on UE declaration of radio link failure and subsequent RRC Connection Re-establishment attempts. For example, the UE performs radio link monitoring (RLM) on the link to the serving cell. The RLM procedure can account for failed LBT procedures which factor into when the UE declares an RLF. The gNB can observe statistics on RLFs from the fleet of UEs based on RRC connection re-establishment attempts. If there is a high rate of re-establishment attempts, the gNB can reduce the ED threshold.

In some alternative embodiments the gNB determines the ED threshold based on the average measured energy on the channel, i.e., the energy detected over a certain time duration where the time duration may be greater than the measurement slot sizes used in the LBT procedure.

In some alternative embodiments the gNB determines the ED threshold based on the one or a combination of more than one set of statistics from all or a subset of the active UEs. As a non-limiting example, some combination of metrics such as the successful packet receive ratio, obtained SINR, ratio of cancelled UL transmissions due to LBT failure, etc. could be used to adapt the threshold In some alternative embodiments the gNB determines the ED threshold based on the receiver sensitivity measured by the received signal strength corresponding to the lowest successful MCS received from the UE over an observation period. As a non-limiting example, the threshold may be raised when lower values for the receiver sensitivity are detected and vice-versa.

In some alternative embodiments the gNB determines the ED threshold based on a combination of any of those methods in Embodiments above.

In some alternative embodiments the UEs determine the ED threshold themselves using any of the above methods if the UEs are configured to do so.

Figure 11:
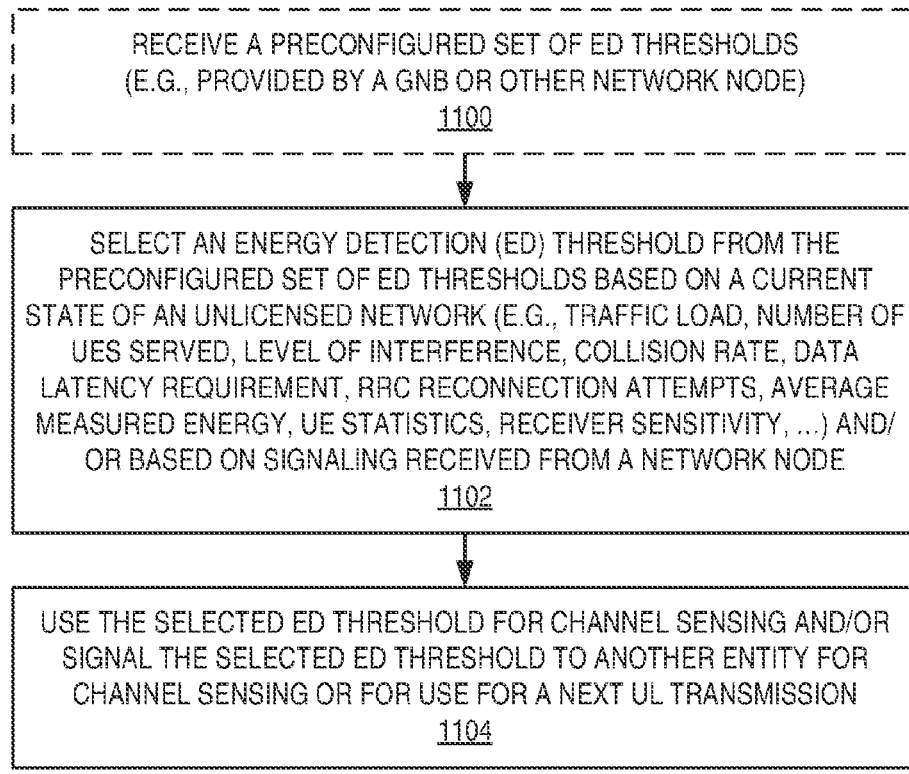
FIG. 11 is a flowchart illustrating a method of determining and dynamically signaling an ED threshold according to the network's state according to some embodiments of the present disclosure.

FIG. 11 is a flowchart illustrating a method of determining and dynamically signaling an ED threshold according to the network's state according to some embodiments of the present disclosure. In the embodiment illustrated in FIG. 11, the method includes the following steps. In optional step 1100, a UE or other device operating in the network receives a preconfigured set of ED thresholds. In some embodiments, the preconfigured set of ED thresholds is transmitted via RRC signaling. Alternatively, the UE or other device has been pre-provisioned with the preconfigured set of ED thresholds. In step 1102, the UE or other device selects a (new) ED threshold based on the current state of the network, which may be defined based on many parameters including but not limited to the traffic load in the network, the number of UEs being served, the level of interference on the carrier etc. In step 1104, the UE or other device uses the (new) ED threshold for channel sensing or signals the selected ED threshold to another entity for channel sensing and/or for use for the next UL transmissions.

In some alternative embodiments the UE or other device can autonomously select an ED threshold out of a set of preconfigured (by the network) ED thresholds (where the set may, e.g., consist of two ED thresholds) or a preconfigured (by the network) ED threshold range, based at least in part on the planned transmit power. For instance, if a high transmit power is to be used, the UE uses a low ED threshold, while if it plans to use a low transmit power, it can use a higher ED threshold. The rationale is that if when planning a strong transmission (potentially causing interference even far away), it is more important to make sure that the channel is free in a large area, which implies a low ED threshold, than if a low transmit power is planned, in which case the UE can use a higher ED threshold.

In some alternative embodiments the ED threshold is chosen based at least in part on information of how harmful interference (if any) a UE would cause for other devices in the area when the UE transmits after detecting energy just below the ED threshold. This is difficult to measure, but information from neighboring gNBs can provide relevant information, e.g., average SINR experienced by the neighbor gNB and/or by the neighbor gNB's UEs.

In some alternative embodiments the ED threshold is chosen based at least in part on information of how often the receiver fails to receive the UE's transmission, or what SINR the receiver of the UE's transmission experiences, when the UE transmits after detecting energy just below or close to the ED threshold. This is difficult to measure, but one helpful means could be to configure/request UEs to, together with UL transmissions, report the ratio between the detected energy and the ED threshold (e.g., in dB) measured during the Clear Channel Assessment (CCA) preceding the UE's transmission. The report could be carried at the MAC layer, e.g., in a MAC CE or as UL control in formation on the PUSCH multiplexed with the UL data. This may well be used together with the above embodiment, for example.

In certain alternative embodiments, the gNB can choose the ED threshold based at least in part on statistics of the detected energy level. The gNB can get this information by recording its own sensing of the channel and by collecting statistics from UEs. UEs can report this on request and/or they could be configured to record such measurement data continuously or repeatedly while in RRC_IDLE, RRC_INACTIVE and/or RRC_CONNECTED state and later report the recorded data, e.g., on request or triggered by certain events, such as state switching (e.g., transition from RRC_IDLE or RRC_INACTIVE to RRC_CONNECTED state) and/or if/when a certain amount of data has been recorded. The reporting can be based on the raw measurements or certain statistics can be reported, e.g., minimum and maximum observed energy levels within a time window, the variance within a time window, or the average lengths of time windows where energy is received above a certain threshold. Such a threshold may be configured to the UE or can be pre-defined to a value such as −82 dBm.

In some alternative embodiments the choice of ED threshold is based at least in part on the deployment situation in the area, e.g., if gNBs (and other deployed transmitters or access points) are dense or sparse. Input to this could be e.g., (a) configured information in the gNB (configured through operation and maintenance means), or (b) information collected from Automatic Neighbor Relation (ANR) reports or similar reports from UEs about the presence of neighbor cells, gNBs, access points, networks, etc., in the area.

In some alternative embodiments the ED threshold could be based at least in part on information from neighboring gNBs, e.g., information about the ED thresholds used by the neighboring gNB and/or its UEs. Neighboring gNBs could report such information to each other across the Xn interface, for instance.

In some alternative embodiments the device observes the wireless medium and records the duration that the wireless medium remains unoccupied between transmissions. In observing these unoccupied periods the device builds statistics including statistics on the idle times between channel occupancies. Based on the statistics, the device optimizes the ED threshold. For instance, if statistical data indicates that many transmissions occur after the shortest duration permitted by regulatory requirements there are many devices competing for access to the wireless medium. Consequently, a dense deployment is found and a higher ED threshold improves spatial frequency reuse.

In some alternative embodiments the gNB selects an ED threshold based on a combination of one or more performance metrics such as cell throughput, user throughput including mean and fifth percentile throughput, mean latency, fifth percentile latency etc. The performance metrics are based on long term collection of statistics at the gNB for both the DL and the UL. The selected thresholds may be different for the DL and the UL.

In some alternative embodiments the different ED thresholds can be selected for different signals. For instance, the ED threshold can be different for, e.g., Random Access (and different triggers for RA) than for other data transmissions. This would be similar as the differentiation done in embodiment 2f. One could for example have the ED threshold be different also for the more urgent RA triggers (HO, UL synch when new data, SR failure) than for less urgent RA triggers (e.g., for SI request).

As an aspect of some or all of the above embodiments, a selected ED threshold may be constrained to be smaller or equal to the maximal ED threshold defined by the regulations. Moreover, the number of values of selected ED threshold may be constrained to not be very large so that they can be signaled to the UEs with acceptable overhead.

ED Threshold Signaling/Configuration

In certain embodiments, an ED threshold is signaled using L1 signaling. As a non-limiting example, the gNB may send ED threshold updates as part of DL scheduling assignment, UL scheduling assignment, or DCIs for other purposes. The signaling may be group common, or UE specific.

In some alternative embodiments the gNB signals the ED threshold to the UEs via UL grant. In order to minimize the specification impact, the ED threshold can be signaled together with LBT category (with some extra bits) in UL grant for LTE-based LAA.

In some alternative embodiments the gNB signals the ED threshold to the UEs via GC-PDCCH. In order to minimize the signaling overhead, the ED thresholds (except the initial ED threshold configured via RRC signaling) are only signaled on a per need basis, i.e., when the gNB sees the need of updating the ED threshold.

In some alternative embodiments ED thresholds can be signaled via both UL grant, GC-PDCCH (and via RRC). Then, the priority of which signal can be overwritten by which signal is pre-configured. For example, the priority could be on time (the former signaling is overwritten by the later regardless of the signal's category) or could be on categories (ED threshold in UL grant is overwritten by the one in GC-PDCCH). Alternatively, it could be the other way around, i.e., the ED threshold received in UE-specific DCI with an UL grant should overwrite the group common ED threshold in GC-PDCCH.

In some alternative embodiments the gNB can signal different ED thresholds to different UEs. For example, if the interference is very different for different UEs due to separated locations, it could be useful to allow different UEs to use different ED thresholds.

In some alternative embodiments when the ED thresholds are only signaled on a per need basis (i.e., when the gNB sees a need to update the ED threshold), the UEs will use the latest ED threshold they received from the gNB.

In some alternative embodiments when the UL transmissions use autonomous UL, the UEs will use the latest ED threshold they received from the gNB.

In some alternative embodiments the signaling of the ED threshold in previous embodiments involves signaling an index into an RRC configured (e.g., in the system information) table with fixed ED values. The table can, e.g., contain the values −72 dBm, −77 dBm, −80 dBm and −82 dBm per 20 MHz.

In some alternative embodiments the signaling of the ED threshold in the previous embodiments may involve signaling an offset in relation to a fixed value which is RRC configured (e.g., configured via system information or dedicated signaling).

In some alternative embodiments the ED threshold is transmitted as part of system information (typically SIB1). The ED threshold in the system information can be used by UEs for transmissions related to initial access or for other than those needed in conjunction with initial access. In another variation, the ED threshold information in the system information may also contain diverse ED threshold information to allow simple and fast low-overhead signaling of ED threshold changes or to enable to autonomously select the ED threshold within certain limits. Such diverse ED threshold information may, e.g., consist of multiple ED thresholds (e.g., to point at, e.g., using indexes, for updates or for a UE to choose between depending on the UE's current situation), an ED threshold range for UEs to choose an ED threshold within (e.g., based on the UE's current situation), conditions associated with the use of each one of a set of ED thresholds, etc.

In some alternative embodiments, the RRC configured ED values can be represented by a reserved value of the slot-format-indicator (SFI) table, such that DCI Format 2_0 carries an indication of the ED value selected from the table. This can be achieved, e.g., by a combination of embodiments as described above.

In some alternative embodiments, a gNB signals the used ED threshold over an inter-gNB link (e.g., Xn or X2) to another gNB.

In some alternative embodiments the signaling of the ED threshold involves signaling an offset in relation to the previously signaled/configured ED threshold. The initial ED threshold can be signaled by RRC configuration (dedicated signaling or system information) or may be signaled via MAC signaling. For instance, the initial ED threshold may be signaled in Msg2 during the random access procedure (i.e., the Random Access Response message), similar to the signaling of the initial Timing Advance, or in the RRCSetup message or the first RRCReconfiguration message after the random access procedure (or in any other RRCReconfiguration message).

In some alternative embodiments the gNB signals to a UE or a group of UEs with a set of supported ED thresholds, then the UE selects the most suitable one based on different criteria, such as UE collected transmission statistics, LBT statistics, measurement data, or QoS requirements of transmitting traffic etc.

In some alternative embodiments, in case of UE initiated COT, the UE signals the selected ED threshold to the gNB so that the gNB uses the same or lower ED during the remainder of the COT.

In some alternative embodiments the gNB signals ED threshold updates in Short Message DCI (e.g., addressed to P-RNTI or some other RNTI) with indication of ED threshold change (explicit value, +/−steps or instruction to check new ED threshold value in the system information). Optionally, the DCI can also contain an indication of either immediate application or later application. Later application could be, e.g., at a certain system frame number, a certain time (e.g., expressed in milliseconds or slots), at the next system information modification period boundary, etc. When later application is indicated, this could optionally mean that later application is allowed if the threshold is being raised, while immediate application is also allowed. Indication of immediate application would, on the other hand, typically mean that immediate application is mandatory, e.g., when the threshold is being lowered.

In some alternative embodiments the gNB signals ED threshold updates using predefined RNTIs, e.g., to signal plus or minus steps (where one RNTI could mean plus 1 step, another RNTI could mean minus 1 step, a third RNTI could mean plus 2 steps, a fourth RNTI could mean minus 2 steps, etc.).

In some alternative embodiments the ED threshold is signaled through group addressed beacon frames (messages) or individually addressed probe frames (messages).

In some alternative embodiments any of the prior signaling methods signal to the UE the mode of operation with respect to the ED threshold. One of the modes can be the use of a fixed maximum ED threshold as defined in the specification or regulation. Another mode can be the use of a RRC configured or dynamically signaled ED threshold by the gNB. A third mode could be autonomous adaptation of the threshold by the UE with a maximum value as defined in the specification or regulation. A fourth mode could be autonomous adaptation of the threshold by the UE with a maximum value as signaled by the gNB. The choice of these four modes can be signaled using any of the methods taught in the previous embodiments including the use of the reserved bit fields in the GC-PDCCH or using DCI messages or a combination of DCI messages and RRC configured information including system information.

While the disclosed subject matter has been presented above with reference to various embodiments, it will be understood that various changes in form and details may be made to the described embodiments without departing from the overall scope of the disclosed subject matter.

Some Example Embodiments

1. A method of operating, e.g., a network node, radio access node, gNB, etc., comprising:
   determining/calculating/detecting/etc. a network state;
   determining/calculating/deriving/etc. an energy detection (ED) parameter (e.g., threshold) for a channel sensing procedure (e.g., listen-before-talk, clear channel assessment, etc.);
   performing channel sensing according to the determined ED parameter, and/or signaling the ED parameter to a wireless communication device (e.g., UE, terminal, etc.)
2. An apparatus (e.g., network node, radio access node, gNB, etc.) comprising processing circuitry, memory circuitry and/or transceiver circuitry collectively configured to perform a method such as that in example embodiment 1.
3. A method of operating a wireless communication device (e.g., UE, terminal, etc.), comprising:
   receiving an energy detection threshold that is determined according to a network state; and
   performing channel sensing according to the determined ED parameter.
4. An apparatus (e.g., wireless communication device, UE, terminal, etc.) comprising processing circuitry, memory circuitry and/or transceiver circuitry collectively configured to perform a method such as that in example embodiment 3.
5. A method or apparatus according to any of the above embodiments, wherein the network state comprises or corresponds to any of the network states as presented and/or indicated in the written description herein.
6. A method or apparatus according to any of the above embodiments, wherein the network state and/or determining/calculating/detecting/etc. of the network state comprises or corresponds to states and/or operations as presented and/or indicated in the written description herein.
7. A method or apparatus according to any of the above embodiments, wherein performing channel sensing according to a determined ED parameter, and/or signaling the ED parameter comprises or corresponds to operations as presented and/or indicated in the written description herein.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AP Access Point
ASIC Application Specific Integrated Circuit
BSC Base Station Controller
BTS Base Transceiver Station
CD Compact Disk
COTS Commercial Off-the-Shelf
CPE Customer Premise Equipment
CPU Central Processing Unit
D2D Device-to-Device
DAS Distributed Antenna System DSP Digital Signal Processor
DVD Digital Video Disk
eNB Enhanced or Evolved Node B
E-SMLC Evolved Serving Mobile Location Center
FPGA Field Programmable Gate Array
GHz Gigahertz
gNB New Radio Base Station
GSM Global System for Mobile Communications
IoT Internet of Things
IP Internet Protocol
LBT Listen-Before-Talk
LEE Laptop Embedded Equipment
LME Laptop Mounted Equipment
LTE Long Term Evolution
M2M Machine-to-Machine
MANO Management and Orchestration
MCE Multi-Cell/Multicast Coordination Entity
MDT Minimization of Drive Tests
MIMO Multiple Input Multiple Output
MME Mobility Management Entity
MSC Mobile Switching Center
MSR Multi-Standard Radio
MTC Machine Type Communication
NB-IoT Narrowband Internet of Things
NFV Network Function Virtualization
NIC Network Interface Controller
NR New Radio
NRF Network Function Repository Function
O&M Operation and Maintenance
OSS Operations Support System
OTT Over-the-Top
PDA Personal Digital Assistant
P-GW Packet Data Network Gateway
RAM Random Access Memory
RAN Radio Access Network
RAT Radio Access Technology
RF Radio Frequency
RNC Radio Network Controller
ROM Read Only Memory
RRH Remote Radio Head
RRU Remote Radio Unit
SCEF Service Capability Exposure Function
SOC System on a Chip
SON Self-Organizing Network
UE User Equipment
USB Universal Serial Bus
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WCDMA Wideband Code Division Multiple Access
WiMax Worldwide Interoperability for Microwave Access Those skilled in the art will recognize improvements and modifications to the embodiments of the present disclosure. All such improvements and modifications are considered within the scope of the concepts disclosed herein.

What is claimed is:

1. A method for dynamically adapting an energy detection (ED) threshold for use in an unlicensed network, the method comprising:
determining an ED threshold based on a current state of an unlicensed network; and
using the determined ED threshold for channel sensing, wherein
determining the ED threshold based on the current state of the unlicensed network comprises determining the ED threshold based on Signal to Interference plus Noise Ratio (SINR) values of one or more uplinks for user equipments (UE) being served,
determining the ED threshold based on the SINR values of the one or more uplinks for the UEs being served comprises:
calculating a SINR value as a function of the SINR values of the one or more uplinks for the UEs being served; and
(i) in response to determining that the SINR value of an uplink is lower than a first threshold, decreasing the value of the ED threshold; or
(ii) in response to determining that the SINR value of the uplink is higher than a second threshold, increasing the value of the ED threshold,
using the determined ED threshold for channel sensing comprises signaling the determined ED threshold to another entity for use to detect if a channel is busy or not, and
signaling the ED threshold comprises signaling an index or an offset into a table containing ED values.

2. The method of claim 1, wherein calculating the SINR value as a function of the SINR values of the one or more uplinks for the UEs being served comprises calculating the SINR value as a minimum SINR value of the SINR values of the one or more uplinks for the UEs being served.

3. The method of claim 1, wherein calculating the SINR value as a function of the SINR values of the one or more uplinks for the UEs being served comprises calculating the SINR value as the linear average of the SINR values of the one or more uplinks for the UEs being served.

4. The method of claim 1, wherein determining the ED threshold based on the current state of the unlicensed network comprises determining the ED threshold based on a declaration or detection of a radio link failure.

5. The method of claim 4, wherein determining the ED threshold based on the declaration or detection of the radio link failure comprises determining the ED threshold based also on a number of Radio Resource Control (RRC) connection re-establishment attempts.

6. The method of claim 1, wherein determining the ED threshold based on the current state of the unlicensed network comprises determining the ED threshold based on a set of one or more statistics from one or more active User Equipments UEs), wherein the set of one or more statistics comprises at least one of:
a successful packet receive ratio;
an obtained Signal to Interference plus Noise Ratio, or
a ratio of cancelled uplink transmissions due to a Listen-Before-Talk failure.

7. The method of claim 1, wherein determining the ED threshold based on the current state of the unlicensed network comprises determining the ED threshold based on a determined receiver sensitivity, wherein the receiver sensitivity is determined by measuring a received signal strength corresponding to a lowest successful modulation and coding scheme received from a user equipment over an observation period.

8. The method of claim 1, wherein signaling the ED threshold comprises signaling via an uplink grant.

9. The method of claim 1, wherein signaling the ED threshold comprises signaling via a Group Common Physical Downlink Control Channel.

10. The method of claim 1, wherein the method is performed by a network node.

11. The method of claim 1, wherein the method is performed by User Equipment.

12. An apparatus for dynamically adapting an energy detection (ED) threshold for use in an unlicensed network, the apparatus comprising:
  processing circuitry; and
  device readable medium storing instructions executable by the processing circuity wherein the apparatus is configured to perform the method of claim 1.

13. The method of claim 1, wherein determining the ED threshold based on the current state of the unlicensed network comprises determining the ED threshold based on a collision rate of downlink or/and uplink transmissions observed over a period.

14. The method of claim 13, wherein determining the ED threshold based on the collision rate comprises determining whether a number of negative acknowledgements over the period is greater than a threshold.

15. The method of claim 1, wherein signaling the index or the offset to the another entity comprises sending the index or offset as part of a downlink scheduling assignment or an uplink scheduling assignment.

* * * * *